United States Patent [19]
Harris

[11] 3,797,459
[45] Mar. 19, 1974

[54] ELECTRIC FISH TANK

[76] Inventor: Daniel J. Harris, 54 Blue Ridge Ln., West Hartford, Conn. 06117

[22] Filed: May 25, 1972

[21] Appl. No.: 256,985

[52] U.S. Cl. .................................. 119/5, 43/17.1
[51] Int. Cl. ............................................ A01k 63/00
[58] Field of Search ................ 119/1, 3, 5; 43/17.1

[56] References Cited
UNITED STATES PATENTS

| | | | |
|---|---|---|---|
| 3,232,271 | 2/1966 | Dosamantes et al. | 119/5 |
| 3,438,356 | 4/1969 | Claff | 119/3 X |
| 3,494,329 | 2/1970 | Frieberger et al. | 119/1 |
| 3,540,413 | 11/1970 | Castaigne | 119/1 |
| 3,324,573 | 6/1967 | Lavallee | 119/5 X |
| 3,550,586 | 12/1970 | Balamuth | 119/3 X |

Primary Examiner—Louis G. Mancene
Assistant Examiner—James H. Czerwonky

[57] ABSTRACT

A fish tank is presented for observation of electrically active fish by the detection of electric or electromagnetic emanations from the fish and conversion to an audio output. A configuration of grounded electrodes effectively divides the tank into a plurality of zones, and other electrodes positioned in the zones, are connected to high gain audio amplifiers whereby electrical emissions of the fish are converted to audio output. The intensity of the detected emanations indicates the relative proximity of the electrically active fish to the other electrodes within their respective zones.

9 Claims, 1 Drawing Figure

ELECTRIC FISH TANK

BACKGROUND OF THE INVENTION

1. Field of the Invention

This invention relates to the field of electric and audio observation of electrically active fish. More particularly, the invention relates to the field of fish tanks which are provided with electrode structures connected to audio amplifiers so that emanations from electrically active fish can be detected and monitored.

2. Description of the Prior Art

In the past, electrode configurations have been used for the purpose of obtaining physiological data from aquatic animals, particularly mammals such as porpoises. However, these applications have involved the direct application of electrodes to the body of the mammal, either by gridling straps or by the form of suction cup application. Electrode configurations have also been employed to establish "fences" or "barriers" to confine fish and facilitate the catching of the fish. In other prior art configurations sonar type devices have been proposed whereby pulses are emanated and the return thereof sensed to serve as counting devices determining the number of fish passing a given station.

None of these prior art devices are concerned with the electric fish tank of the present invention wherein electrode configurations and high gain audio amplifiers are deployed to observe and monitor electrically active fish.

SUMMARY OF THE INVENTION

Although not necessarily limited to home and hobby aquarium environments, the present invention is, nevertheless, particularly suited for such home and hobby use. In the present invention electrode structures are established at the opposite sides of the fish tank, and a virtual or effective ground plane is established across the tank intermediate of the sides. The electrode structure at the ends of the tank may be in the form of a single electrode whereby two zones are established relative to the ground plane, or it may take the form of pairs of electrodes near the corners of the tank whereby four zones are defined in conjunction with the ground plane. The end electrodes are connected to high gain audio amplifiers, and electrical signals emanated by electrically active fish in the tank are picked up by the electrodes and amplified for audio presentation through the amplifiers. In this way, electric or electromagnetic emanations from the fish are converted into a stereophonic audio presentation, the stereo effect being related to the zones established in the tank. Thus, a new dimension is added to aquarium configurations, particularly home and hobby aquariums, for enhanced entertainment and educational purposes.

BRIEF DESCRIPTION OF THE DRAWING

The single FIGURE of the drawing is a perspective view, partly broken away, of an aquarium type fish tank of the present invention.

DESCRIPTION OF THE PREFERRED EMBODIMENT

Figure 1:
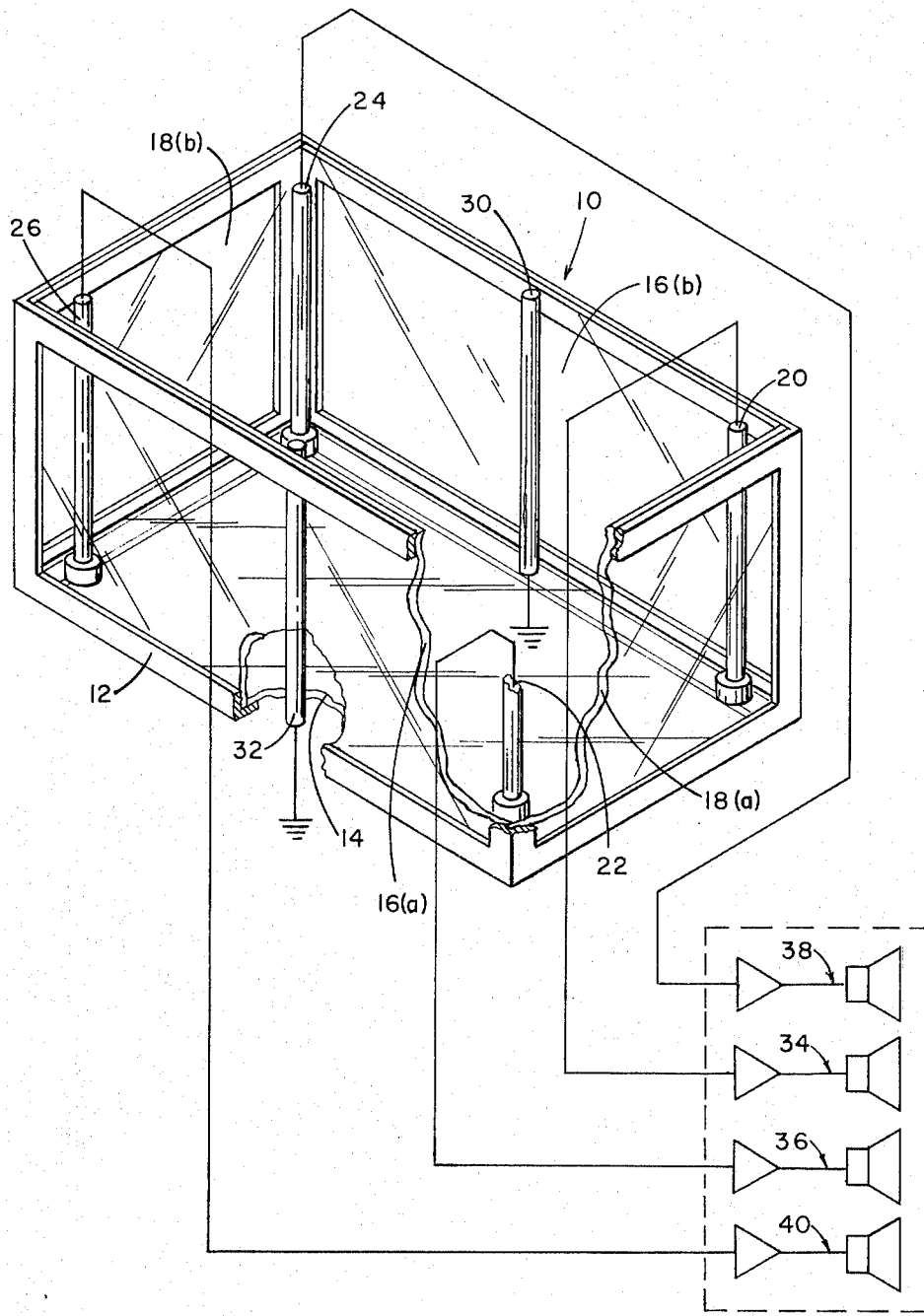

Referring to the single FIGURE of the drawing, a fish tank 10 is shown which has a metal frame 12. The frame 12 is lined with a bottom glass panel 14, front and rear glass panels 16(a) and 16(b), and side glass panels 18(a) and 18(b), these glass panels being sealed at their junctions to provide a water tight container. As seen in the FIGURE, parts of the frame and glass panels are shown broken away for ease of illustration of parts of the structure, but it will be understood that the frame and glass extend across those parts broken away to form a completed structure which is a water tight container which may either be open at the top or which may, if desired, have a glass panel or other closure on the top as well.

A pair of electrodes 20 and 22 are positioned at the corners of the right side of the tank; a similar pair of electrodes 24 and 26 are positioned at the corners on the left side of the tank, and a third pair of electrodes 30 and 32 are positioned adjacent to the front and rear glass panels approximately midway between the sides of the tank. All of these electrodes may be of any suitable electrode material such as metal, carbon, or conductive plastic. Electrodes 30 and 32 are grounded. This grounding of electrodes 30 and 32 may be accomplished in any convenient fashion and is only shown schematically in the drawing. This grounding of electrodes 30 and 32 defines an effective ground plane from the front to the back of the tank, thus effectively dividing the tank into two electric or magnetic zones to the left and right of the ground plane. The zone to the right of the ground plane is further effectively divided into two electric or magnetic zones transverse to the ground plane by electrodes 20 and 22; and, similarly, the zone to the left of the ground plane is also divided into two electric or magnetic zones transverse to the ground plane by electrodes 24 and 26. These transverse zones may be referred to as subzones to distinguish them from the zones to the left and right of the ground plane.

Each of the corner electrodes 20, 22, 24 and 26 is connected, respectively, to the input of high gain audio amplifiers of amplifier-speaker audio units 34, 36, 38 and 40. Thus, each of these amplifier-speaker units corresponds to one of the four zones defined by the electrode structure in the tank.

Assuming that the tank contains water and fish which are electrically active in the sense that they emanate electric or electromagnetic signals, those signals will be picked up by the electrodes and will result in audio output from the audio amplifiers.

The division of the tank into four zones as described above results in a four zone stereo effect system, with the stereo effects being noted from front to back and from side to side of the tank. Each of the electrodes 20 through 26 is positioned in one of the four zones into which the tank is effectively divided, and the output from the audio amplifier and speaker associated therewith will vary depending on the proximity of the source of electric signal to the electrode, i.e., the audio output will vary in a four zone stereo manner depending on the relative position of the fish in the tank with respect to the electrodes and the four zones. Also, the amplitude of the audio outputs will vary over a period of time depending on the movement of the fish as the fish approaches or retreats from any of the corner electrodes or the ground plane defined by the central electrodes. Thus, new dimensions, both from education and amusement standpoints are added to fish aquarium structures by the present invention.

As shown in the drawing, the tank frame 12 is grounded to reduce the effects of any stray electric fields such as those from a.c. power lines. If these fields were picked up they would be reproduced as noise on the speakers. This grounding of the frame also serves as a safety precaution, but that safety feature is a redundant one since the frame is actually insulated from the tank water and thus from the electrodes by the glass lining the interior of the frame.

While the electrodes have been shown in the form of rods, they could also be in other forms such as screens, plates, balls, coils or strips or coatings of conductive material. Instead of the four corner electrodes shown, the end glass plates 18(a) and 18(b) could be coated with conductive coatings. Furthermore, it will be noted that a two zone stereo effect can be obtained if that is desired rather than the four zone effect by using only one centrally disposed electrode adjacent to or coated on the end glass plates 18(a) and 18(b).

While the foregoing discussion has been directed to a system wherein the electrical signals emanating from the fish are converted into sound effects so that one may "hear" the fish, the system is reversible. That is, the outputs of the amplifiers are connected to the electrodes and the amplifiers are driven by any desired audio source wereby electrical signals can then be delivered to the electrodes to "talk" to the fish and observe the reactions of the fish to various sound inputs.

While a preferred embodiment has been shown and described, various modifications and substitutions can be made thereto without departing from the spirit and scope of the invention. Accordingly, the present invention has been described by way of illustration and not limitation.

While the previous discussion has been directed to a tank of rectangular cross-section, with one ground plane, it will be understood that the tank can be of any desired shape and that a plurality of ground planes can be defined to divide the tank into a plurality of zones, which can be further divided into subzones if desired.

What is claimed is:

1. A fish tank including:
   means defining a tank;
   means for establishing at least one effective ground plane in said tank to divide said tank into at least two electric or magnetic zones;
   electrode means positioned in said tank in each of said zones for detecting emanations from electrically active fish; and
   audio units connected to said electrode means to produce audio outputs corresponding to emanations detected by respective ones of said electrode means, whereby the intensity of the detected emanations indicates the relative proximity of the electrically active fish to said electrode means within their respective zones.

2. A fish tank as in claim 1 wherein said electrode means includes:
   means for dividing each of said zones into subzones.

3. A fish tank as in claim 2 wherein:
   said electrode means includes a pair of electrodes positioned in each of said zones, one each of said pair of electrodes being positioned in each of the subzones.

4. A fish tank as in claim 1 wherein:
   said means for establishing an effective ground plane includes a pair of grounded electrodes positioned in and spaced apart in said tank.

5. A fish tank as in claim 4 wherein:
   said electrode means in each zone includes a pair of electrodes spaced apart in each zone.

6. A fish tank as in claim 5 wherein:
   said tank is substantially rectangular in cross section; and
   said ground electrodes are between the sides of the tank to define the effective ground plane about midway of said tank; and
   said electrodes in each zone are adjacent corners of the tank.

7. A fish tank as in claim 1 wherein:
   said tank has a grounded metal frame.

8. A fish tank including:
   means defining a tank;
   electrode means positioned in said tank for detecting emanations from electrically active fish; and
   audio units connected to said electrode means to produce audio outputs corresponding to emanations detected by respective ones of said electrode means, whereby the intensity of the detected emanations indicates the relative proximity of the electrically active fish to said electrode means within their respective zones.

9. A fish tank as in claim 8 wherein said electrode means includes means for effectively dividing said tank into a plurality of zones.

* * * * *